J. Darling,
Circular Saw.
N° 20,147.    Patented May 4, 1858.
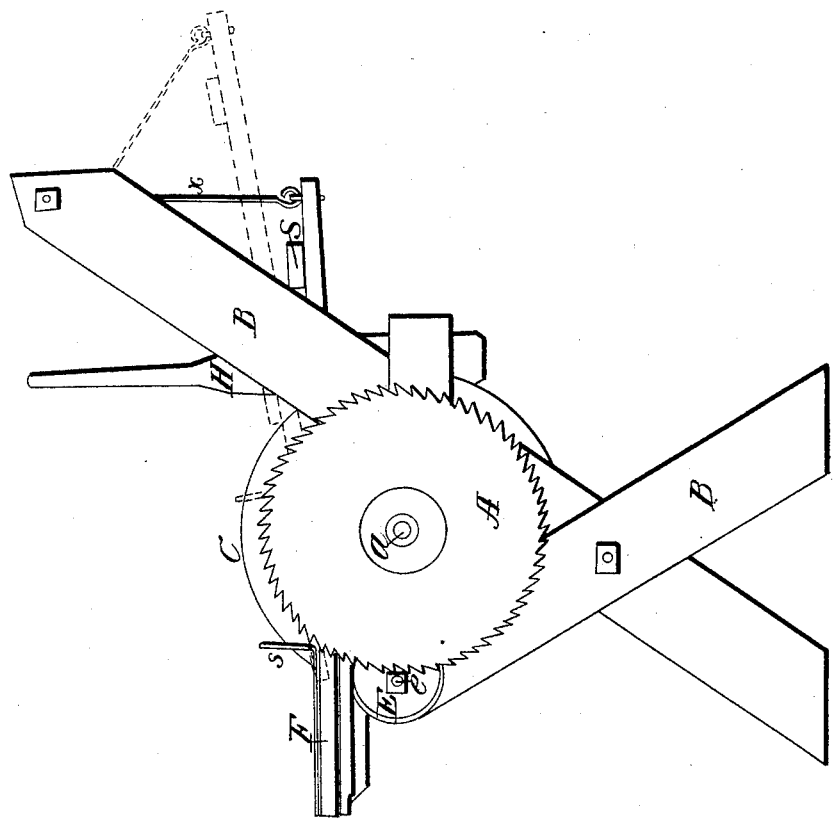

UNITED STATES PATENT OFFICE.

J. DARLING, OF CINCINNATI, OHIO.

FEEDING DEVICE FOR CROSSCUT SAWING-MACHINES.

Specification of Letters Patent No. 20,147, dated May 4, 1858.

*To all whom it may concern:*

Be it known that I, JEREMIAH DARLING, of Cincinnati, in the county of Hamilton and State of Ohio, have invented a new and Improved Sawing-Machine; and I do hereby declare that the following is a full and exact description thereof, reference being had to the accompanying drawings and to the letters of reference marked thereon.

In crosscut sawing machines, it is difficult to regulate the feed, in sawing heavy stuff of irregular thickness. It is usually necessary to move the reciprocating table by hand, and the object of my invention is to facilitate such movement.

In the accompanying drawings an end view of my machine is given.

My invention consists of a reciprocating saw-carriage or table, suspended at one end, while the other is supported by rollers.

My machine may have any suitable frame B. The main axle or shaft, $a$, carries on one end the saw A, and upon the other a band roller and a balance wheel C. Near the front or edge of the saw is another axle, $e$, carrying two rollers, one of which is seen at E. These rollers support one end of the table F, upon which is a stop $s$. The other end of the table is supported by two links, $x$.

A brake lever H, works against the face of the balance wheel C.

The operation of my machine is as follows. Whatever is to be sawed is placed upon the table F and held firmly against the stop $s$. Then the table F is pushed gently back while the stuff is being sawed. The red lines show the table pushed completely back, and the suspended end of the table somewhat elevated. From this position the table returns with ease because it descends during such motion.

It will be observed that the axles $e$, and roller E, are placed under the point where the saw cuts, so as to afford firm support to the stuff during the process of sawing. This roller E, runs in a groove on the under side of the table.

Having thus fully described my invention, what I claim and desire to secure by Letters Patent of the United States is:

The reciprocating table F, suspended at one end and supported by rollers at the other, to facilitate the operation of cross-cut sawing, substantially as set forth.

JEREMIAH DARLING.

Witnesses:
DANIEL BREED,
EDW. F. BROWN.